(12) United States Patent
Upchurch et al.

(10) Patent No.: US 7,371,358 B2
(45) Date of Patent: May 13, 2008

(54) CATALYST FOR TREATMENT AND CONTROL OF POST-COMBUSTION EMISSIONS

(75) Inventors: Billy T. Upchurch, deceased, late of Virginia Beach, VA (US); by Wilhelmina H. Upchurch, legal representative, Virginia Beach, VA (US); David R. Schryer, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 199 days.

(21) Appl. No.: 10/975,117

(22) Filed: Oct. 25, 2004

(65) Prior Publication Data

US 2006/0088459 A1   Apr. 27, 2006

(51) Int. Cl.
*B01D 53/94* (2006.01)
*B01J 23/00* (2006.01)
*B01J 24/00* (2006.01)

(52) U.S. Cl. .................. 423/213.5; 502/326; 502/332; 502/333; 502/334; 502/335; 502/336; 502/339; 502/310; 502/313; 502/314; 502/315; 502/316; 502/352; 502/327

(58) Field of Classification Search ............... 502/242, 502/258–261, 310, 313–317, 326–327, 330, 502/332–339, 344, 347, 348, 352; 423/213.5
See application file for complete search history.

(56) References Cited

U.S. PATENT DOCUMENTS

| | | | | |
|---|---|---|---|---|
| 3,580,970 A | * | 5/1971 | Swift | 568/799 |
| 3,607,916 A | * | 9/1971 | Kominami et al. | 560/243 |
| 3,686,340 A | * | 8/1972 | Patrick et al. | 585/485 |
| 4,018,710 A | * | 4/1977 | Oshimura et al. | 502/223 |
| 4,829,035 A | * | 5/1989 | Upchurch et al. | 502/34 |
| 4,839,330 A | * | 6/1989 | Hess et al. | 502/53 |
| 4,855,274 A | * | 8/1989 | Upchurch et al. | 502/339 |
| 4,912,082 A | * | 3/1990 | Upchurch et al. | 502/218 |
| 4,991,181 A | * | 2/1991 | Upchurch et al. | 372/59 |
| 5,306,684 A | | 4/1994 | Itoh et al. | |
| 5,516,741 A | | 5/1996 | Gascoyne et al. | |
| 5,585,083 A | | 12/1996 | Kielin et al. | |
| 5,593,935 A | | 1/1997 | Golunski et al. | |
| 5,726,117 A | * | 3/1998 | Khare et al. | 502/400 |
| 5,851,948 A | | 12/1998 | Chuang et al. | |
| 5,939,220 A | * | 8/1999 | Gunner et al. | 429/40 |
| 5,968,345 A | | 10/1999 | Alario et al. | |
| 5,994,606 A | | 11/1999 | Iwakura et al. | |
| 6,128,899 A | | 10/2000 | Oono et al. | |
| 6,132,694 A | * | 10/2000 | Wood et al. | 423/245.1 |
| 6,174,835 B1 | | 1/2001 | Naito et al. | |
| 6,184,430 B1 | * | 2/2001 | Venkatesh et al. | 585/750 |
| RE37,663 E | | 4/2002 | Golunski et al. | |
| 6,461,579 B1 | | 10/2002 | Hachisuka et al. | |
| 6,635,795 B2 | * | 10/2003 | Gislason et al. | 585/820 |
| 6,818,589 B1 | * | 11/2004 | Gillespie | 502/326 |
| 6,914,033 B2 | * | 7/2005 | Gislason et al. | 502/400 |
| 6,930,074 B2 | * | 8/2005 | Khare et al. | 502/342 |
| 7,105,140 B2 | * | 9/2006 | Price et al. | 423/327.1 |
| 7,220,704 B2 | * | 5/2007 | Morton et al. | 502/407 |
| 2003/0144143 A1 | * | 7/2003 | Jordan et al. | 502/330 |
| 2004/0007498 A1 | * | 1/2004 | Gislason et al. | 208/15 |
| 2004/0038816 A1 | * | 2/2004 | Morton et al. | 502/352 |
| 2004/0178117 A1 | * | 9/2004 | Morton et al. | 208/15 |
| 2005/0081443 A1 | * | 4/2005 | Aiello et al. | 48/198.3 |
| 2005/0127325 A1 | * | 6/2005 | Turaga et al. | 252/189 |
| 2006/0094592 A1 | * | 5/2006 | Gillespie et al. | 502/208 |

OTHER PUBLICATIONS

Robert S. Braman and Maria A. De La Cantera, "Sublimation Sources for Nitrous Acid and Other Nitrogen Compounds in Air," Anal. Chem. 1986, 58, , Department of Chemistry, University of South Florida, Tampa, FL 33620, p. 1533-1537.

* cited by examiner

*Primary Examiner*—Cam N. Nguyen
(74) *Attorney, Agent, or Firm*—Helen M. Galus

(57) ABSTRACT

The present invention utilizes two precious metals with two to five different metal-oxides in a layered matrix to convert CO, HCs, and NOx to $CO_2$, and $N_2$ by oxidation of two components and reduction of the other in a moderately high temperature gaseous environment containing excess oxygen.

18 Claims, No Drawings

CATALYST FOR TREATMENT AND CONTROL OF POST-COMBUSTION EMISSIONS

ORIGIN OF THE INVENTION

This invention was made by employees of the United States Government and may be manufactured and used by or for the government for governmental purposes without the payment of royalties thereon or therefore.

BACKGROUND OF THE INVENTION

1. Field of the Invention

This invention relates generally an oxidation/reduction catalyst. It relates particularly to an improved oxidation/reduction catalyst for the treatment and control of post combustion emissions.

2. Description of the Related Art

Emissions from fossil-fuel combustion contribute significantly to smog, acid rain, and global warming problems and are subject to stringent environmental regulations. The most significant regulated emissions include CO, $CH_4$ and unburned hydrocarbons (HCs), and NOx. These regulations are expected to become more stringent as state and regional authorities become more involved in addressing these environmental problems. Better systems are needed for catalytic control. Exhaust emission composition characteristics of fossil-fuel burning internal combustion engines vary with air-fuel mixtures. The most energy-efficient operation is under stoichiometric conditions where exhaust oxygen levels are less than 1.0 vol %. Under this condition, exhaust gas temperature is much higher and HCs and NOx levels are much higher than for operations under lean-burn conditions. In order to better control emissions, modern engines are operated under lean-burn conditions to minimize CO and NOx emission levels so that catalytic converters are better able to reduce them below regulatory levels. In all air-fuel mixtures, CO and HC levels are considerably higher than NOx levels (Ref. Gas Research Institute RFP #94-260-0470, 1994) and are potential candidate reagents for the reduction of NOx to $N_2$ with a catalyst which catalyzes the reducing chemical reduction.

In general, existing catalytic converters used for NOx and HC emission control use precious metal or combinations (PM's) as wash coats with various architectures over alumina on ceramic substrates to effect catalytic conversion. Some of the more common are coatings of Pd, Pd/Rh, or Pt/Rh.

Existing catalytic converters are less effective for removal of methane HC emissions due to the high light-off temperatures for methane on these catalysts. The greater challenge to existing emission control technology is ultra-low HC and NOx emission performance with higher converter operating temperatures (e.g. near stoichiometric air-fuel mixtures for more efficient engine operation) (Ref. Manufacturers of Emission Controls Association: Advanced Emission Control Technologies for LEV 2 Standards Meeting, May 1998).

In response to the need for the next generation of catalysts for automotive applications, low-temperature oxidation catalysts were developed by NASA Langley Research Center. These improved catalysts are described in U.S. Pat. Nos. 4,829,035; 4,839,330; 4,855,274; 4,912,082, 4,991,181, 5,585,083; 5,948,965 and 6,132,694 and are hereby incorporated by reference as if set forth in their entirety herein. These catalysts exhibit several key advantages over the current state-of-the-art. First, unlike the thick, inert layer of alumina used in conventional catalyst technology, these catalysts can use a single active tin-oxide coating (<5 microns) that enhances the catalytic performance by acting as an oxygen storage device. Second, their active washcoat reduces the temperature (i.e., light-off) at which the catalyst begins converting pollutants (e.g. CO, HC and $NO_X$) to non-pollutant gases, as well as, requiring less precious metal to attain the same pollutant gas conversion efficiency over time. Third, these catalysts are capable of capturing enough oxygen from the natural exhaust stream to complete the chemical reactions. Unlike traditional catalytic converter technology, external air sources and the ancillary sensors, air pumps, and hoses are not required for catalytic converter operation.

Despite these advances in catalyst technology, there remains a need for an improved catalyst capable of oxidation and reduction for a variety of applications. Specifically, there remains a need for an oxidation/reduction catalyst for use in diesel and natural gas applications as well as non-automotive pollution sources.

SUMMARY OF THE INVENTION

The purpose of the invention described herein is to provide an improved catalyst for emission control of CO, HC and NOx emissions.

The present invention utilizes at least two precious metals (PM) with at least two different metal-oxides (for example, tin-oxide plus one or more promoters) in a layered matrix to convert CO, HCs, and NOx to $CO_2$, and $N_2$ by oxidation of the first two components (CO, HCs) and reduction of the third (NOx) in a moderately high temperature gaseous environment (for example, between about 200° C. to about 500° C.) containing excess oxygen.

The advantages of the present invention include: (1) lower light-off temperatures can enable oxidation of methane emissions to $CO_2$ for natural gas fueled vehicles at lower exhaust gas temperatures; (2) lower light-off temperatures for CO and HC's enables more efficient catalytic conversion to $CO_2$ at lower cost; (3) a tin-oxide base wash-coat on a ceramic substrate minimizes loss of coating through cracking, peeling or dusting mechanisms; (4) the PM coatings are on the top surface and are enabled to be more efficiently used, thus requiring less PM resulting in lower PM costs; and (5) the mixed PMs result in a more efficient oxidation/reduction catalyst and may be applied in one step.

DETAILED DESCRIPTION OF THE INVENTIONS

The oxidation/reduction catalyst according to the present invention consists of two or more precious metals. The PMs are dispersed on a metal oxide possessing more than one oxidation state (e.g., tin-oxide, manganese-oxide, etc.), and the catalyst is promoted by at least one metal-oxide promoter known to adsorb $NO_X$ species. PMs useful herein include ruthenium in combination with at least one precious metal chosen from the group of: platinum, palladium, gold, rhodium and silver, which precious metals can together comprise about 0.1 to about 15 percent of the catalyst by weight (not including a substrate) with the balance being the metal oxide and promoter oxides. The desired percentage can vary, depending upon the operating temperature and size of the catalyst. Better performance can also be realized in most cases with higher PM loadings. The utilization of two precious metals, one being ruthenium and one from above-referenced group, can enhance the catalyst's ability to not only oxidize volatile organic compounds to carbon dioxide and water, but to reduce $NO_X$ as well. The result can be a more efficient oxidation/reduction catalyst requiring less total precious metal than a catalyst utilizing only one PM, thus lowering the cost of the catalyst. The metal oxide upon which the precious metals are dispersed is preferably tin-oxide.

Additionally, at least one promoter metal oxide is chosen from metal oxide species from the transition series of the periodic table which are known to adsorb $NO_X$ species, namely, $Fe_2O_3$, NiO, $Co_2O_3$ and $WO_3$ (Braman, Robert S., De la Cantera, Maria A., "Sublimation sources for nitrous acid and other nitrogen compounds in air," *Anal. Chem.* pp. 1533-7, 1986). The composition of the promoter oxide(s) can vary from about 1.0 to about 15 weight percent of the total catalyst material (i.e., not including a substrate). In one embodiment, especially good results are found with about 10.0 weight percent of the catalyst being $Fe_2O_3$, NiO, $Co_2O_3$, combined with about 1.25 weight percent of the catalyst being platinum and ruthenium (in substantially equal amounts), with the balance being tin-oxide. The catalyst can exist as a powder, or it can be prepared as a coating on supports such as granules, pellets, honeycomb monoliths, or fabrics.

A catalyst employed in the present inventive process can be prepared as follows: The preparation of similar powder catalysts or catalysts coated on silica gel, silica beads, or pellets has been presented in our earlier U.S. patents "Process for Making a Noble Metal on Tin Oxide Catalyst," U.S. Pat. No. 4,855,274, "Catalyst for Carbon Monoxide Oxidation," U.S. Pat. No. 4,912,082, and "Catalyst for Carbon Monoxide Oxidation," U.S. Pat. No. 4,991,181, which patents are hereby incorporated by reference as if set forth in their entirety herein.

Preparation of ruthenium/platinum-tin-oxide-based catalyst coatings for pellets, beads, granules, fabrics, and especially ceramic honeycomb monoliths can be accomplished by successive layering of the desired components, as follows: (1) A clean, dry substrate is deaerated in a solution containing tin (II) 2-ethylhexanoate (SnEH, hereafter). The substrate is removed from the solution and excess solution is removed from the substrate. Residual solution components are evaporated leaving an SNEH layer on the substrate which is thermally decomposed in air to tin-oxide at 300° C. Several layers are applied in the same manner to achieve the desired loading of tin-oxide. (2) The promoters are added to the catalyst matrix in a similar fashion. For example, an iron oxide promoter is added to an existing tin-oxide-coated substrate by dearating in an iron nitrate solution, removing excess solution, evaporating the solvent, and finally thermally decomposing the nitrate to oxide. (3) Platinum is added to the coated substrate as above using an aqueous solution of tetraamine platinum (II) dihydroxide or other platinum salt, and then thermally decomposing the salt. Instead of the thermal decomposition, a reductive decomposition can be used. For example, the catalyst coated substrate is heated in an atmosphere containing a reducing gas such as carbon monoxide or hydrogen to induce reduction of the platinum salt to platinum. A similar process can be used to add the second precious metal (i.e., ruthenium), for example, by starting with an appropriate salt, or the mixed PMs may be applied in one step.

The instant catalyst can absorb the NOx species and convert them to NO. As such, nitrosyl complexation takes place with a noble metal in order to allow it to react with a reducing agent and therefore be converted to nitrogen. Preferred metal-oxide promoters are: $Fe_2O_3$, NiO, and $Co_2O_3$. The metal-oxide adduct with NOx is converted to NO on desorption. The NO is subsequently transferred and bound to the PM until reduced by CO and HC's to $N_2$. The CO and HC's are similarly oxidized by NO or $O_2$ and $SnO_2$ at the PM interface site.

EXAMPLE

A well-performing embodiment of the present invention included utilizing Pt/Ru/$SnO_2$ plus promoters $Fe_2O_3$, NiO, and $Co_2O_3$, in a catalyst prepared utilizing the methods and techniques set forth above, with the final catalyst comprising the following component ingredients: 37.99 g of $SnO_2$; 4.256 g of promoter metal oxides including 1.448 g of $Fe_2O_3$, 1.454 g of $Co_2O_3$ and 1.354 g of NiO; 0.269 g Pt and 0.265 g of Ru. This catalyst had been applied to a 371.53 g cordierite substrate, and had 0.0788 g promoter/in$^3$ and 0.0099 g PM/in$^3$. A short-term test in a catalytic converter, using standard EPA protocol as defined for automobile catalysts, was performed on the catalyst. The results of this test showed a 78.0% HC conversion, a 83.2% CO conversion, and a 87.4% $NO_X$ conversion, which was a reduction below EPA requirements (Short-term test).

Tests were run on a variety of different catalyst formulations. Notably, those formulations which contained the promoters $Fe_2O_3$, NiO, and $Co_2O_3$, in combination with Pt/$SnO_2$ or Pt/Pd/$SnO_2$ with the same or similar PM loadings, showed some reduction of NOx, yet they did not perform as well as catalysts also containing ruthenium.

It should be understood that the foregoing description and examples are only illustrative of the invention. Various alternatives and modifications can be devised by those skilled in the art without departing from the invention. Accordingly, the present invention is intended to embrace all such alternatives, modifications and variances that fall within the scope of the appended claims.

We claim:

1. An oxidation/reduction catalyst composition for the oxidation of CO and hydrocarbons and the reduction of $NO_X$ in gaseous environments at temperatures of from about 200° C. to about 500° C. comprising:

from about 70.0% to about 98.9% weight percent, based on the total weight of the catalyst, a metal oxide possessing more than one oxidation state;

from about 0.1 to about 15.0 weight percent, based on the total weight of the catalyst, of at least two precious metals, wherein:

one precious metal is ruthenium, and at least one of the precious metals is chosen from the group consisting of platinum, palladium, gold, rhodium and silver; and from about 1.0 percent to about 15.0 percent of total promoter metal oxide based on the weight of the catalyst, of at least one promoter selected from the group consisting of $Fe_2O_3$, NiO, $Co_2O_3$ and $WO_3$.

2. The catalyst of claim 1 wherein the metal oxide possessing more than one oxidation state is tin oxide.

3. The catalyst of claim 1 wherein the catalyst is supported on a substrate.

4. The catalyst of claim 1 wherein said at least one promoter comprises at least two promoters.

5. The catalyst of claim 4 wherein said at least two promoters comprise three promoters, which are $Fe_2O_3$, NiO, and $Co_2O_3$.

6. The catalyst of claim 1 wherein said at least one promoter is either $Co_2O_3$, or are at least two promoters chosen from the group consisting of $Fe_2O_3$, NiO, $Co_2O_3$ and $WO_3$.

7. The catalyst of claim 1 wherein said at least two precious metals are Pt and Ru.

8. The catalyst of claim 1 wherein:
said precious metals comprise about 1.25 weight percent, based on the total weight of the catalyst;
said promoter metal comprises about 10 weight percent, based on the total weight of the catalyst; and
said tin-oxide comprises about 89 weight percent, based on the total weight of the catalyst.

9. The catalyst of claim 8 wherein:
said precious metals are Ru and Pt, wherein each precious metal comprises approximately 0.625 weight percent; and
said at least one promoter comprises three promoters which are $Fe_2O_3$, NiO, and $Co_2O_3$.

10. The process for the oxidation of CO and hydrocarbons and the reduction of NOx, at temperatures between about 200° C. and about 500° C., which process comprises exposing a gaseous mixture comprising CO, hydrocarbons and NOx to a catalyst comprising from about 70 to about 98.9 weight percent, based on the total weight of the catalyst, tin-oxide; from about 0.1 to about 15.0 weight percent, based on the total weight of the catalyst, of at least two precious metals, wherein one of said at least two precious metals is ruthenium; and from about 1.0 to about 15.0 weight percent, based on the total weight of the catalyst of at least one promoter selected from the group consisting of $Fe_2O_3$, NiO, $Co_2O_3$ and $WO_3$.

11. The process of claim 10, wherein at least one of the at least two precious metals is chosen from the group consisting of platinum, palladium, gold, rhodium and silver.

12. The process of claim 11 wherein said at least two precious metals are Pt and Ru.

13. The process of claim 11 wherein:
said at least two precious metals comprise about 1.25 weight percent, based on the total weight of the catalyst;
said at least one promoter metal-oxide comprises about 10 weight percent, based on the total weight of the catalyst; and
said tin oxide comprises about 89 weight percent, based on the total weight of the catalyst.

14. The process of claim 13 wherein:
said precious metals are Ru and Pt, wherein each comprises approximately 0.625 weight percent; and
said at least one promoter comprises three promoters which are $Fe_2O_3$, NiO, and $Co_2O_3$.

15. The process of claim 10 wherein the catalyst is supported on a substrate.

16. The process of claim 10 wherein said at least one promoter is either $Co_2O_3$, or are at least two promoters chosen from the group consisting of $Fe_2O_3$, NiO, $Co_2O_3$ and $WO_3$.

17. The process of claim 10 wherein said at least one promoter comprises at least two promoters.

18. The process of claim 17 wherein said at least two promoters comprise three promoters which are $Fe_2O_3$, NiO, and $Co_2O_3$.

\* \* \* \* \*